United States Patent
Vandrak et al.

(10) Patent No.: US 7,823,579 B2
(45) Date of Patent: Nov. 2, 2010

(54) VERTICALLY-STORABLE COMBUSTION HEATER

(75) Inventors: Brian S. Vandrak, Highland Heights, OH (US); Donald C. Haney, Strongsville, OH (US); Dennis O'Toole, Rocky River, OH (US)

(73) Assignee: Enerco Group, Inc, Cleveland, OH (US)

( * ) Notice: Subject to any disclaimer, the term of this patent is extended or adjusted under 35 U.S.C. 154(b) by 0 days.

(21) Appl. No.: 11/867,350

(22) Filed: Oct. 4, 2007

(65) Prior Publication Data

US 2008/0184982 A1    Aug. 7, 2008

Related U.S. Application Data

(60) Provisional application No. 60/849,307, filed on Oct. 4, 2006.

(51) Int. Cl.
*F24H 3/00* (2006.01)

(52) U.S. Cl. .............. 126/116 R; 126/110 C; 126/110 B; 126/99; 432/222; 431/350

(58) Field of Classification Search ............. 126/116 R, 126/110 R, 110 B, 110 C, 99; 432/222; 431/350
See application file for complete search history.

(56) References Cited

U.S. PATENT DOCUMENTS

| | | | | |
|---|---|---|---|---|
| 4,288,218 A | * | 9/1981 | Obinata | 432/222 |
| 4,340,362 A | * | 7/1982 | Chalupsky et al. | 432/222 |
| 4,443,187 A | * | 4/1984 | Shaftner et al. | 432/222 |
| 4,640,680 A | * | 2/1987 | Schilling | 431/350 |
| 5,738,084 A | * | 4/1998 | Hussong | 126/512 |
| 5,867,926 A | * | 2/1999 | Schmitt | 37/227 |
| 6,648,635 B2 | * | 11/2003 | Vandrak et al. | 432/222 |
| 6,880,549 B2 | * | 4/2005 | Topp | 126/110 B |

* cited by examiner

*Primary Examiner*—Steven B McAllister
*Assistant Examiner*—Avinash Savani
(74) *Attorney, Agent, or Firm*—Brouse McDowell; John M. Skeriotis; Stephen J. Presutti

(57) ABSTRACT

A vertically storable combustion heater having a fuel tank having a generally-cylindrical passage formed in the fuel-tank housing through which an axle extends to support one or more wheels; a heating conduit that is coupled to the fuel tank and includes an outermost shell that is substantially concentric with an inner shell that has a smaller diameter than the outermost shell; a control panel that is connected to the combustion heater to interface with an operator and allows the operator to input instructions governing the operation of the combustion heater; a frame that at least partially encases the heating conduit and fuel tank; a hose having a return curve and nozzle; and a combustion chamber that is defined by the interior periphery of the inner shell.

17 Claims, 4 Drawing Sheets

VERTICALLY-STORABLE COMBUSTION HEATER

RELATED APPLICATIONS

This application claims priority to U.S. Ser. No. 60/849,307 entitled VERTICALLY-STORABLE COMBUSTION HEATER, filed Oct. 4, 2006. All of the subject matter disclosed by U.S. Ser. No. 60/849,307 is hereby incorporated by reference into this application.

BACKGROUND OF THE INVENTION

1. Field of the Invention

The present invention is directed generally to a combustion heater, and more specifically, to a combustion heater that includes a liquid fuel tank and that can be stored in a substantially-vertical orientation with minimal or no leakage of liquid fuel from the liquid fuel tank.

2. Description of Related Art

Traditional heaters, such as kerosene, direct-fired forced air heaters, typically include a combustion chamber coupled to a fuel tank and a fall for pushing ambient air through the heater. Once the air has been heated, the fall forces the air from the heater into the room being heated. To make larger models mobile, the heater can also be equipped with a set of wheels allowing an operator to transport the heater in manner analogous to that in which a commercial dolly is maneuvered. The fuel tank is typically a large, elongated horizontal cavity in which a liquid fuel such as kerosene is stored prior to being consumed by the heater. The liquid fuel is metered into the combustion chamber of the heater where it is exposed to an ignition source, thereby causing combustion of the fuel.

Conventional heaters typically include a hose that runs from an inlet formed in the fuel tank to a nozzle through which the fuel is injected into the combustion chamber. When the heater is tilted in slightly fi-om its horizontal position in which the heater is fired, such as when the heater is being relocated from one location to another, liquid fuel in the fuel tank either sloshes into the hose towards the nozzle, or is forced by gravity into the hose toward the nozzle. Either way, liquid fuel leaks through the nozzle and out of the heater. The amount of the leakage is worsened when the fuel tank is full. Any leakage of liquid fuel from the fuel tank results in a hazardous condition that can expose nearby people to toxic fumes as well as lead to accidental fires.

Additionally, direct-fired forced air heaters are typically formed as cylindrical combustion chambers. Ambient air is drawn into the combustion chamber at one end, heated within the chamber when exposed to the combusting fuel, and forced fi-om the other end of the combustion chamber as heated air. The end into which the ambient air is drawn is open, thereby exposing this end to the ambient environment. Pollutants and other foreign objects entering this end of the heater can affect combustion and the overall performance of the heater. Such pollutants and other foreign objects can also shorten the useful of the life of the heater.

Conventional forced air heaters are also designed to be stable while oriented in a generally horizontal orientation in which they are intended to be fired. Such a configuration makes the conventional heaters unstable while oriented in any other orientation. However, due to the significant leakage of fuel from the fuel tank while the heater is oriented other than its horizontal orientation in which it is intended to be fired, there has not before been a need to make the heaters stable in any other orientation. Furthermore, heaters that are equipped with wheels allowing the heater to be relocated from one position to another expose the wheels to the ambient environment being heated. Such a configuration makes conventional heaters susceptible to damage, and complex to assemble.

Accordingly, there is a need in the art for a mobile combustion heater that can be readily relocated from one position to another while minimizing or eliminating the leakage of fuel from the fuel tank. The heater can optionally also be stored in orientations other than the orientation in which it is intended to be fired with minimal or no leakage of fuel from the fuel tank while so oriented. The heater can also optionally minimize the amount of debris and pollutants that can enter the combustion chamber through the end of the heater into which ambient air is drawn.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 2:
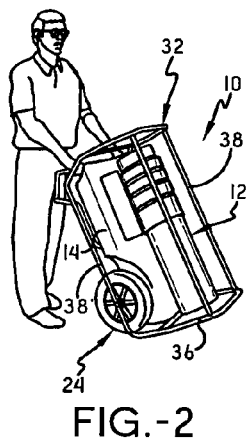
FIG. 2 is a perspective view of an operator maneuvering a combustion heater in accordance with an embodiment of the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 1:
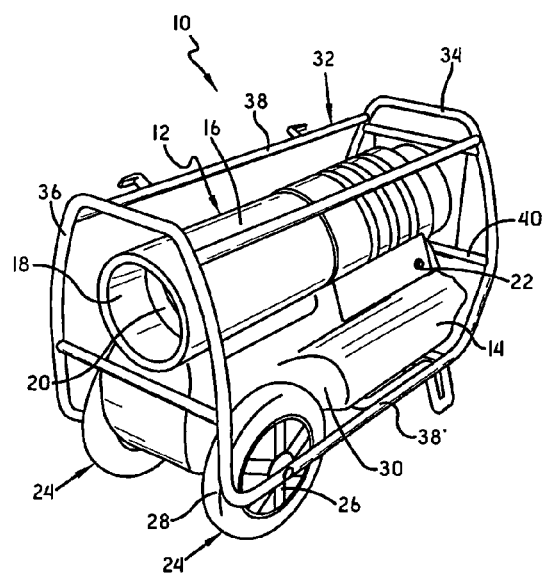
FIG. 1 is a perspective view of a combustion heater in accordance with an embodiment of the present invention.

FIG. 1 illustrates a combustion heater 10 in accordance with all embodiment of the present invention. As shown in FIG. 1, the combustion heater 10 includes a heating conduit 12 coupled to a fuel tank 14. The heating conduit 12 includes an outermost shell 16 that is substantially concentric with an inner sleeve 18. The inner sleeve 18 has a smaller diameter than the shell 16, and is spaced radially inward of the outer shell 16 to provide thermal insulation therebetween. A combustion chamber 20 is defined by the interior periphery of the inner shell 18.

The fuel tank 14 is formed as a housing that defines a hollow interior cavity 21 (FIG. 4) in which the liquid fuel is stored. The housing 14 can be fabricated from any suitably-durable and fuel-resistant material such as a metal, metal alloy, plastic, combination of plastics, any combination thereof, and the like. Embodiments of the combustion heater 10 include a fuel tank 14 molded as a single piece from a plastic material such as high density polyethylene. Unlike other heaters, the fuel tank 14 can optionally be fabricated entirely from a plastic material, instead of a metallic material provided with a plastic housing for protection. Use of such plastic materials can minimize weight of the combustion heater 10, thereby enhancing the maneuverability of the combustion heater 10.

A control panel 22 is operatively connected to the combustion heater 10 to interface with the operator and allow the operator to input instructions governing the operation of the combustion heater 10. The control panel 22 can optionally include one or more of the following control devices: a lock, an on/off switch, an ignition switch, a temperature controller, a fuel controller, any other control device selected with sound engineering judgment, and any combination thereof. A control method for controlling operation of the combustion heater 10 will be described in detail below.

One or more wheels 24 can optionally be provided to facilitate transportation of the combustion heater 10. Each wheel 24 can include a rim 26 provided with a rubberized exterior coating 28 about its exterior periphery. According to an embodiment of the combustion heater 10, the fuel tank 14 includes a generally-cylindrical passage formed in the housing through which an axle extends to support the wheels 24. Each wheel 24 can also optionally be positioned within a wheel well 30 formed in the fuel tank 14. The wheel wells 30 allow the wheels 24 to be recessed inwardly toward the center of a fuel tank 14 thereby giving the combustion heater 10 a generally-streamlined configuration.

A frame 32 fabricated from an arrangement of tubes or rods made from a metal or other suitably-strong material for supporting the weight of a fully fueled combustion heater 10 forms a cage that at least partially encases the heating conduit 12 and fuel tank 14. The frame 32 includes a proximate end 34 and a distal end 36 separated by longitudinally extending members 38. A cross member 40 can serve as a handle at the proximate end 34, allowing the operator to grasp the combustion heater 10 and maneuver it as desired. A member 38' can extend longitudinally along each side of the combustion heater 10 adjacent to the fuel tank 14 and externally of the wheels 24. In this arrangement, the member 38' allows for simplified installation of the wheels 24 and the frame 32, and also protects the wheels 24 from impacting nearby objects while the combustion heater 10 is being maneuvered.

FIG. 2 illustrates transportation of the combustion heater 10 in a somewhat vertical orientation according to an embodiment of the present invention. The orientation of the combustion heater 10 shown in FIG. 2 is but one of the possible orientations in which the combustion heater 10 can be oriented without leaking any or significant amounts of liquid fuel from the fuel tank 14. This orientation is an example of what is meant herein by references to an orientation other than the orientation in which the combustion heater 10 is intended to be fired, which is the orientation shown in FIG. 1.

Figure 3:
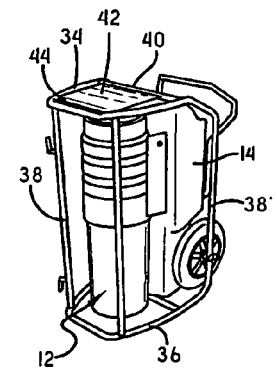
FIG. 3 illustrates an embodiment of a combustion heater in a substantially-vertical storage orientation.

FIG. 3 illustrates an embodiment of a combustion heater 10 in a substantially-vertical storage orientation. When not in use, the combustion heater 10 can be stood on the distal end 36 of the frame 32. The tubing made from a metal or other strong material that forms the distal end 36 of the frame 32 is patterned to give the distal end 36 a suitably-wide footprint that can maintain the combustion heater 10 in the substantially vertical orientation shown in FIG. 3. The footprint of the distal end 36 can optionally be large enough to maintain the substantially-vertical orientation of the combustion heater 10 even when minor forces are imparted on the combustion heater 10 above the distal end 36 with reference to FIG. 3.

While the combustion heater 10 is in the substantially-vertical storage orientation, a rain shield 42 is positioned to interfere with the entry of falling objects or other debris into the heating conduit 12. The rain shield 42 can be a planar sheet of metal or other rigid material that extends between the cross member 40 that serves as the handle and a second cross member 44. With the rain shield 42 positioned as shown in FIG. 3, it interferes with the entry of falling objects into the end of the heating conduit 12 in which air is drawn from the ambient environment.

The combustion heater 10 has been described thus far and illustrated in the drawings as optionally including a rain shield 42 adjacent to the ambient air intake end of the heating conduit 12. However, it is to be noted that the present invention is not limited solely to such an arrangement. Instead, the present invention also encompasses a combustion heater 10 that can be stored in a substantially-vertical orientation such that the discharge end of the heating conduit 12 from which heated air is forced is aimed upwardly, and the ambient air intake end is aimed toward the ground. Of course, the fuel-management system of the present invention described below will be adapted accordingly.

Figure 4:
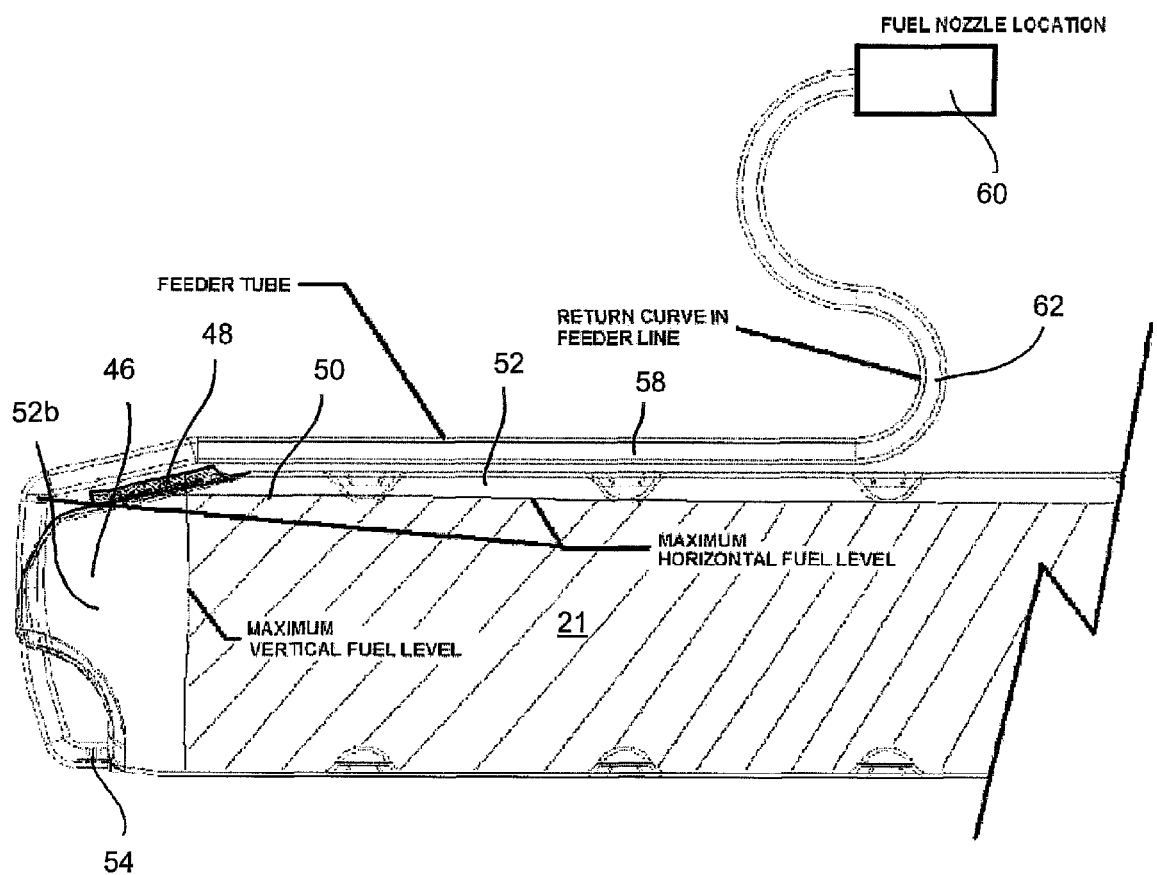
FIG. 4 is a cross-section view of a fuel tank in accordance with an embodiment of the present invention.

FIG. 4 is a cross-section view of an embodiment of a fuel tank 14, which forms a portion of the combustion heater's fuel-management system. The fuel tank 14 includes one or more cavities 46 that alternately accommodates liquid fuel and all air gap that is shifted when the combustion heater 10 is transitioned from its firing orientation (shown in FIG. 1) to its substantially-vertical storage orientation (shown in FIG. 3), and vice versa. A fuel outlet 54 is provided adjacent to the lowermost portion of the fuel tank( 14 while the combustion heater 10 is in its horizontal firing position. Positioning the fuel outlet 54 in this manner allows approximately all of the fuel to be removed from the fuel tank 14 during operation of the combustion heater 10.

A hose 58 is connected between the fuel outlet 54 and a nozzle 60 through which the fuel is metered into the combustion chamber 20. The hose 58 can be fabricated from any material that will resist damage and degradation from exposure to the particular fuel used to fire the combustion heater 10. Examples of the types of fuels the hose 58 will transport include, but are not limited to, kerosene, diesel fuel oil, and the like.

The hose 58 includes an arcuate portion 62, which is also referred to herein as a return curve 62. The return curve 62 is positioned on the combustion heater 10 such that the return curve 62 is oriented similar to a "U" while the combustion heater 10 is in its substantially-vertical storage orientation, with both arms aimed upwardly in a direction generally opposing the acceleration of gravity.

The location of the fuel inlet 48 through which liquid fuel can be inserted into the fuel tank 14 limits the amount of fuel that can be placed in the fuel tank 14. With the combustion heater 10 in its firing orientation, the lowest point of the fuel inlet 48 marks the upper fuel level limit 50. Thus, the air gap 52a is disposed above the upper fuel level limit 50 and the liquid fuel in the fuel tank 14. When the combustion heater 10 is transitioned to the substantially-vertical storage orientation shown in FIG. 3, the fuel in the fuel tank 14 shifts to position an air gap 52b adjacent to the fuel outlet 54. An example of a suitable size for the air gaps 52a, 52b is about 0.4 gallons with the fuel tank 14 at its maximum capacity, but air gaps 52a, 52b of any size is within the scope of the present invention.

The shifting of the fuel in the fuel tank 14 when the combustion heater 10 is transitioned from the intended firing orientation to the substantially-vertical storage orientation creates a vacuum at the fuel outlet 54. The vacuum results in the siphoning of fuel from the hose 58 back into the fuel tank 14 instead of allowing the fuel to leak from the nozzle 60. Additionally, most, if not all of the remaining fuel not siphoned back into the fuel tank 14 is allowed to pool in the return curve 62 in the hose 58 instead of draining from the nozzle 60. This further minimizes leakage of the fuel from the combustion heater 10.

In a particular embodiment, the above-described vacuum can be understood as a hydraulic difference in the fuel levels between hose 58 and fuel tank 14. This difference in hydraulic fuel levels results in the drawing of fuel from the hose 58 back into the fuel tank 14 through the tank outlet 54 instead of allowing the fuel to leak from the nozzle 60. Additionally, all of the remaining fuel not drawn back into the fuel tank 14 is allowed to pool in the return curve 62 in the hose 58 instead of draining from the nozzle 60. This eliminates the leakage of the fuel from the combustion heater 10.

Figure 5:
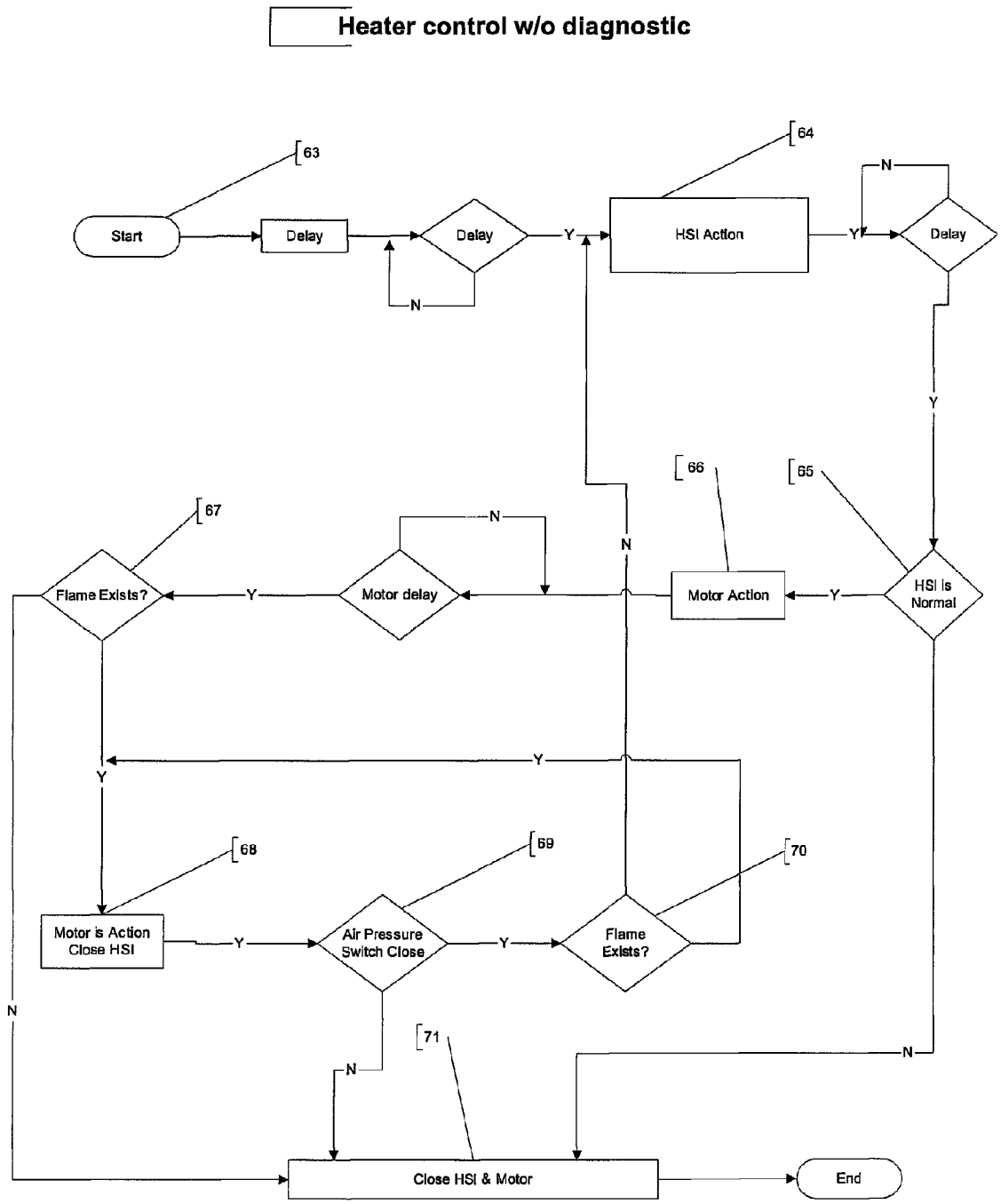
FIG. 5 illustrates steps of a method of controlling a combustion heater in accordance with an embodiment of the present invention.

FIG. 5 shows a flow diagram illustrating a method of controlling a combustion heater 10 without diagnostics according to an embodiment of the present invention. The method can be carried out by an electronic control unit that includes a circuit that can be assembled according to sound engineering judgment to perform the control method steps. For example, the control unit can be a microprocessor based controller that is electrically isolated from power electronics by optoisolators, pulse transformers, and the like.

As shown in FIG. 5, the combustion heater 10 is started at step 63 by the control unit, followed by a delay and the energizing at step 64 of a hot surface igniter ("HSI"), which establishes the flame within the combustion chamber 20. Once it is determined that the HSI is functioning properly at step 65, the control unit activates a motor of a fall unit for forcing air through the heating conduit 12 at step 66 to heat the environment in which the combustion heater 10 is located. If the existence of the flame ignited by the HSI within the combustion chamber 20 is confirmed by the control unit at step 67, then the HSI is deactivated at step 68 and the operational state of the motor of the fall unit is confirmed at step 69. Assuming the status of the motor determined at step 69 is operational, the control unit continues to monitor the flame to ensure that it has not been distinguished at step 70. If the presence of the flame is confirmed at step 70, then the method begins to loop by returning to a check of the operational state of the motor at step 68.

If it is determined at step 65 that the HSI is not operating properly, or at step 67 that the flame in the combustion chamber 20 does not exist, or at step 69 that the motor is not operational, then the control unit causes deactivation of the motor of the fall unit and the HSI. If any of these conditions causes a termination of the combustion heater's operation, the operator will be alerted to the existence of a problem requiring attention before the combustion heater 10 can be activated. Alternately, upon the occurrence of such conditions that cause termination of the combustion heater's operation, the control unit can optionally cycle through the method shown in FIG. 5 again. This way, if the condition leading to termination of the combustion heater's operation was temporary and no longer exists by the next cycle, proper operation of the combustion heater call resume. However, according to such embodiments, when the number of attempts to resume operation of the combustion heater 10 exceeds a predetermined limit, the combustion heater 10 will cease to function until it is reset by the operator.

Figure 6:
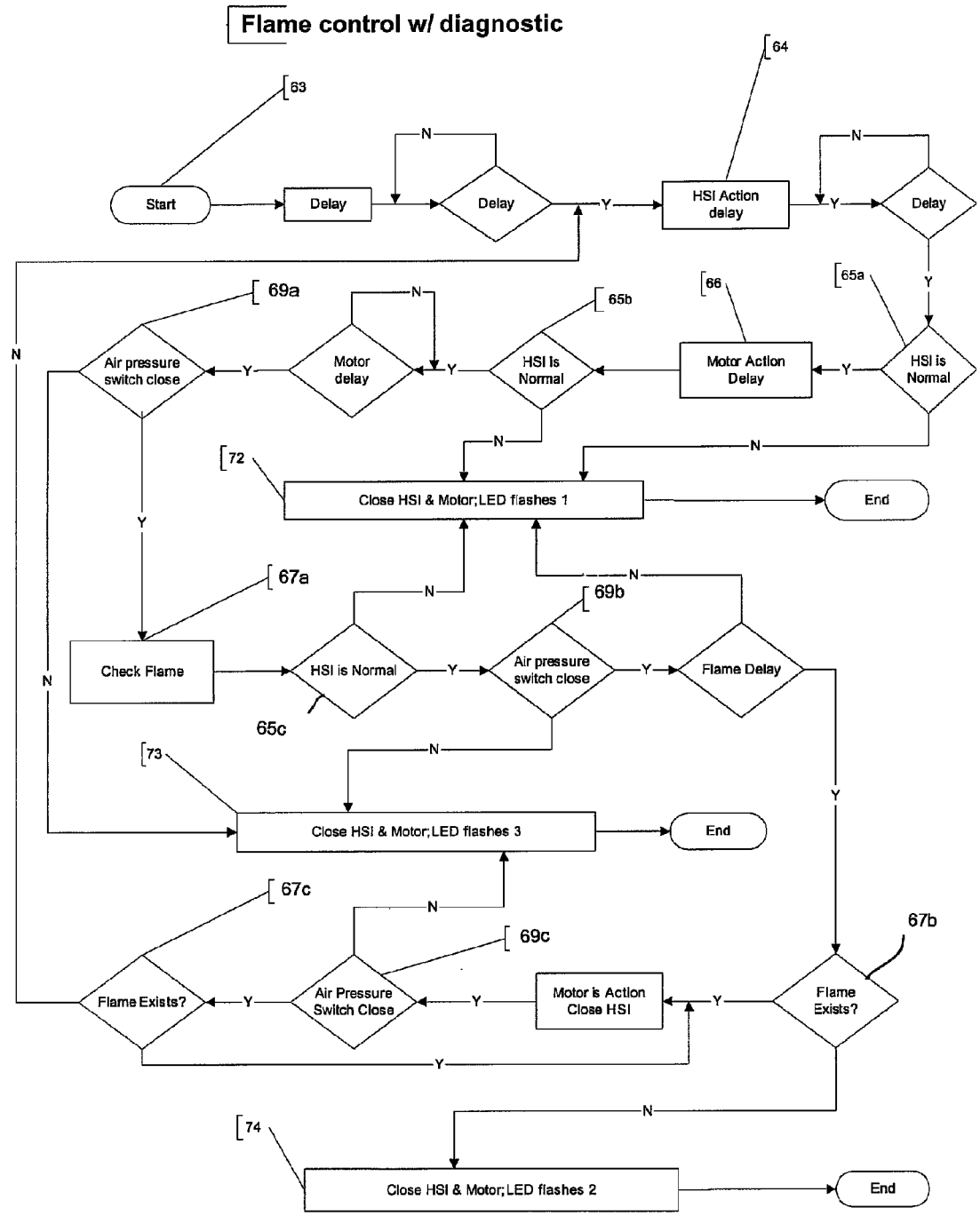
FIG. 6 illustrates steps of a method of controlling a combustion heater in accordance with an embodiment of the present invention offering diagnostic functions.

FIG. 6 illustrates steps of a method of controlling a combustion heater 10 in accordance with an embodiment of the present invention offering diagnostic functions. In a manner similar to that described above, the combustion heater 10 is started at step 63 by the control unit, followed by the energizing at step 64 of the HSI. Once it is determined that the HSI is functioning properly at step 65a, the control unit activates a motor of a fall unit for forcing air through the heating conduit 12 at step 66 to heat the environment in which the combustion heater 10 is located. Un-like the method described above with reference to FIG. 5, the method of FIG. 6 includes step 65b, at which the proper operation of the HSI is again confirmed. Assuming the proper operation of the HSI is again confirmed at step 65b, the operational state of the motor of the fan unit is confirmed at step 69. Having confirmed proper operation of the motor, the existence of the flame is confined at step 67 followed by checks of the HSI's operational status and the motor's operational status at steps 65c and 69b, respectively.

To this point, if it is determined by the control unit that the HSI has ceased to function properly at any of steps 65a, 65b and 65c, the control unit causes the HSI and the motor to be deactivated, and also causes an indicator such as an LED to flash at step 72. The indicator can identify where the fault condition has occurred by flashing a predetermined number of times, flashing a predetermined color, flashing all LED dedicated for such a fault condition, and the like.

The method of FIG. 6 continues by once again confirming the existence of the flame within the combustion chamber 20 at step 67b. If the flame exists, operation of the motor is again confirmed at step 69c. If the flame does not exist as determined at step 67b, then again the HSI and motor are deactivated, and the indicator again indicates the absence of the flame to the operator with a unique indication dedicated to identify such a fault condition at step 74.

If it is determined at ally of steps 69a, 69b and 69c that the motor of the fall unit is not operating properly, then the control unit ceases operation of the HSI, discontinues attempts to operate the motor, and issues a unique indication at step 73 indicating the malfunction of the motor. As shown in FIG. 6, the indication is three LED flashes, but just as before, the indication can be any type of audible, visual or other indicator that indicates the presence of a fault condition and the nature of the fault condition. Following the flame check at step 67c, the control unit begins to loop until the absence of the flame is detected, at which time the control unit returns to the start of the method at step 64.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention.

What is claimed is:

1. A vertically storable combustion heater, said heater comprising:

a tank adapted to contain fuel, said tank fluidly engaged with a fuel conduit at a connection point, said fuel tank adapted to siphon fuel from said fuel conduit when said heater is transitioned from a first orientation for operation, to a second orientation for storage, wherein said first orientation is horizontal and said second orientation is vertical;

a heating conduit that is coupled to the fuel tank and includes an outermost shell that is substantially concentric with an inner shell that has a smaller diameter than the outermost shell;

a control panel that is connected to the combustion heater to interface with an operator and allows the operator to input instructions governing the operation of the combustion heater;

a frame that at least partially encases the heating conduit and fuel tank, the frame extending beyond opposite ends of the tank and the heating conduit such that the combustion heater rests on an end of the frame in the second orientation; and a combustion chamber that is defined by the interior periphery of the inner shell wherein in said second orientation, said fuel conduit comprises an upright U-shaped section forming a return curve wherein liquid fuel can pool when the combustion chamber is in the second orientation.

2. The vertically storable combustion heater of claim 1, further comprising one or more wheels each positioned within a wheel well that is formed in the fuel tank and recessed inwardly toward the center of the fuel tank, said one or more wheels each having an internal side oriented substantially toward the heater and an external side oriented substantially away from the heater.

3. The vertically storable combustion heater of claim 1, wherein the control panel has a lock, on/off switch, ignition switch, a temperature controller, and a fuel controller.

4. The vertically storable combustion heater of claim 1, wherein the fuel-tank is molded as a single piece entirely from plastic.

5. The vertically storable combustion heater of claim 4, wherein the plastic is high-density polyethylene.

6. The vertically storable combustion heater of claim 1, wherein the inner shell is spaced radially inward of the outer shell to provide thermal insulation therebetween.

7. The vertically storable combustion heater of claim 1, wherein the frame includes a proximate end and a distal end separated by longitudinally extending members.

8. The vertically storable combustion heater of claim 7, wherein the frame further comprises a cross member serving as a handle at the proximate end that allows an operator to grasp the combustion heater and maneuver it as desired.

9. The vertically storable combustion heater of claim 7, further comprising a member that extends longitudinally along each side of the combustion heater externally of the one or more wheels, and adjacent to the external side of the one or more wheels, the member protecting the one or more wheels from impacting nearby objects while the combustion heater is being maneuvered.

10. The vertically storable combustion heater of claim 7, wherein the distal end has a suitably-wide footprint that can maintain the combustion heater in a substantially vertical orientation.

11. The vertically storable combustion heater of claim 1, wherein the combustion heater can be transported in a somewhat vertical orientation without leaking any fuel from the fuel tank.

12. The vertically storable combustion heater of claim 1, wherein the combustion heater further comprises a rain shield positioned adjacent to and offset from, an air intake of the heating conduit, said rain shield adapted to prevent the penetration of rain therethrough, and to interfere with the entry of falling objects or other debris into the heating conduit.

13. The vertically storable combustion heater of claim 12, wherein the rain shield is a substantially flat planar sheet of metal or other rigid material.

14. The vertically storable combustion heater of claim 1, further comprising a fuel outlet that is adjacent to the lowermost portion of the fuel tank while the combustion heater is in orientation for operation.

15. The vertically storable combustion heater of claim 14, comprising a hose or other fluid conduit adapted to provide fluid communication between the fuel outlet and a nozzle adapted to convey fuel into the combustion chamber.

16. The vertically storable combustion heater of claim 1, further comprising a fuel inlet through which fuel can be inserted into the fuel tank and also limits the amount of fuel that can be placed in the fuel tank.

17. A vertically storable combustion heater, said heater comprising:

a fuel tank adapted to contain a liquid fuel,
said fuel tank fluidly engaged with a fuel conduit at a connection point,
said fuel tank molded as a single piece;
wherein said heater is transitionable
from a first orientation for operation,
to a second orientation for storage said first orientation being horizontal and said second orientation being vertical;
said heater further comprising,
an adaptation to siphon liquid fuel from the fuel conduit when the heater is transitioned from said first orientation for operation to said second orientation for storage;
a heating conduit that is coupled to the fuel tank and comprises
an outermost shell, and
an inner shell substantially concentric with said outer shell, said inner shell
being of smaller diameter than the outermost shell, and
spaced radially inward of the outer shell to provide thermal insulation therebetween;
a hose or other fluid conduit comprising an upright U-shaped return curve adapted to function as a region wherein liquid fuel can pool when the combustion heater is in the second orientation for storage;
a control panel that is connected to the combustion heater to interface with an operator and allows the operator to input instructions governing the operation of the combustion heater;
a frame that at least partially encases the heating conduit and fuel tank, the frame comprising,
a proximate end and a distal end separated by longitudinally extending members,
said distal end comprising members between the longitudinally extending members suitably-wide footprint to maintain the combustion heater in a substantially vertical orientation, and
a cross member serving as a handle at the proximate end that allows an operator to grasp the combustion heater and maneuver it as desired;
a combustion chamber that is defined by the interior periphery of the inner shell;
a plurality of wheels;
a fuel outlet adjacent to the lowermost portion of the fuel tank when the combustion heater is in orientation for operation; and
a fluid conduit adapted to provide fluid communication between the fuel outlet and a nozzle adapted to convey fuel into the combustion chamber.

* * * * *